United States Patent [19]

Kopf

[11] Patent Number: 5,504,578
[45] Date of Patent: Apr. 2, 1996

[54] TEMPORAL FRINGE PATTERN ANALYSIS SYSTEM OF A LASER GAIN MEDIA

[75] Inventor: Dana C. Kopf, USAF Academy, Colo.

[73] Assignee: The United States of America as represented by the Secretary of the Air Force, Washington, D.C.

[21] Appl. No.: 363,771

[22] Filed: Dec. 22, 1994

[51] Int. Cl.⁶ .................................................. G01B 9/02
[52] U.S. Cl. .......................... 356/345; 356/346; 356/35.5
[58] Field of Search ................................ 356/345, 346, 356/35.5, 342 T; 372/6, 28, 32

[56] References Cited

U.S. PATENT DOCUMENTS

| | | | |
|---|---|---|---|
| 3,578,980 | 5/1971 | Decker, Jr. et al. | 250/237 |
| 3,955,891 | 5/1976 | Knight et al. | 356/74 |
| 4,007,989 | 2/1977 | Wajda | 356/96 |
| 4,435,838 | 3/1984 | Gourlay | 382/68 |
| 4,442,454 | 4/1984 | Powell | 358/167 |
| 4,580,162 | 4/1986 | Mori | 358/135 |
| 5,050,989 | 9/1991 | Van Tassel et al. | 356/310 |
| 5,136,172 | 8/1992 | Nakata et al. | 356/432 T |
| 5,349,437 | 9/1994 | Bobb | 356/345 |

*Primary Examiner*—Samuel A. Turner
*Assistant Examiner*—Robert Kim
*Attorney, Agent, or Firm*—William G. Auton

[57] ABSTRACT

An interferometric based diagnostic for experimentally determining the time-dependent OPD change in an optically heated media works by heating a glass window with a $CO_2$ laser, effectively simulating high power end-pumping in a rod. Temporal OPD changes are measured by automated counting of interference fringes as they are generated by the thermal effects, and a two-dimensional, time-dependent model is developed to describe the radial temperature distribution in a cylinder, the stress and strain distributions, the thermal expansion, and the associated OPD change caused by a Gaussian heat source.

18 Claims, 3 Drawing Sheets

TEMPORAL FRINGE PATTERN ANALYSIS SYSTEM OF A LASER GAIN MEDIA

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to lasers, and more specifically the invention pertains to a diagnostic tool for measuring thermal effects in optically-heated laser rods.

Diode lasers have seen increasing use for optically exciting solid-gain media. As pump power increases, so does heat generation in the gain media. The temperature gradient causes an OPD change through both a refractive index change and thermal expansion. Thermal stress and strain is also generated in the material. The strain in turn causes a larger refractive index change, and the stress may cause material damage. The OPD change results in thermal lensing and birefringence. These effects cause concern over the output beam quality and durability of the optically excited laser. Similar problems exist during high power frequency conversion.

Unwanted heat generated in optically-pumped solid-state lasers causes thermal gradients, strain, and thermal expansion which in turn results in a nonuniform optical path difference (OPD) increase across the gain media. This ultimately results in poor beam quality.

The task of analyzing thermally induced optical path changes of optically pumped lasers is alleviated, to some extent, by the systems disclosed in the following U.S. patents, the disclosures of which are incorporated herein by reference:

U.S. Pat. No. 5,050,989 issued to VanTassel et al;
U.S. Pat. No. 4,007,989 issued to Wajda;
U.S. Pat. No. 4,580,162 issued to Mori;
U.S. Pat. No. 4,442,454 issued to Powell;
U.S. Pat. No. 4,435,838 issued to Gourlay;
U.S. Pat. No. 3,955,891 issued to Knight et al.; and
U.S. Pat. No. 3,578,980 issued to Decker.

While the above cited references are instructive, the ongoing task remains to increase the performance of optically-pumped laser rods.

Old methods of fringe pattern analysis were done with pencil, ruler and paper. While this may work for an unchanging fringe pattern, it would be extremely difficult if not impossible for analysis of a dynamic pattern. Other computer codes written to analyze dynamic patterns use a spatial counting technique, in other words they count the fringe shift by comparing it to some fixed location on the image. Problems with this method include spatial noise buildup and it will not work if there are discontinuities in the fringe pattern or fringe walk off at the boundaries.

Problems associated with heat generation in optically-pumped media necessitate a thorough understanding of the temperature and stress distributions in these materials. Optical interferometry provides a non-intrusive, high resolution method for this purpose, by allowing one to measure the OPD change. Once this is known, an integrated temperature and stress distribution can be extracted in the direction of interest. It is then possible to correct for thermal lensing, study birefringence, optimize cooling schemes, and/or develop a warning for crystal damage.

The number of fringes crossing a given position over time is proportional to the OPD increase for that position.

The purpose of this invention is to count the number of bright fringes which pass through a two-dimensional array of pixel locations over a given time. The number of fringes is directly proportional to the optical path change which created the fringe shift and can be used to analyze the cause of the optical path change, for example the temperature gradient in an optically-pumped laser rod.

SUMMARY OF THE INVENTION

The present invention is interferometric based diagnostic for experimentally determining the time-dependent OPD change in an optically heated media was developed. This device is demonstrated by heating a glass (BK7) window with a $CO_2$ laser, effectively simulating high power end-pumping in a a rod. Temporal OPD changes are measured by automated counting of interference fringes as they are generated by the thermal effects.

A two-dimensional, time-dependent model is developed to describe the radial temperature distribution in a cylinder, the stress and strain distributions, the thermal expansion, and the associated OPD change caused by a Gaussian heat source. This compared to the experimental data for the BK7 window to determine the validity of the approximations and its usefulness for other systems. Good agreement between the model and experiment, within 10 percent was observed.

One embodiment of the invention is an interferometric based diagnostic system for determining the time dependent change in the optical path difference in an optically heated sample of a laser gain media using:

a probe beam laser, an optical heat source system, an interferometer, a camera and a central processing limit.

In one example the sample used is a BK7 silicon window, but the sample may be any laser gain media: Si, GaAs, InP, GaN, GaP, AlAs, InAs, InSb etc.

In operation, the probe beam laser emits a probe beam which is split and directed through the sample under test by the interferometer while the sample is optically heated by the optical heat source system. The optical heat source system contains a $CO_2$ laser, an alignment He, Ne laser three mirrors, and a beam splitter used to combine the alignment beam and the $CO_2$ beam.

The interferometer is a Mach-Zehnder interferometer that contains two beam splitters and two mirrors to split and direct the probe beam into the sample laser gain media, and output an inteferometry beam through the sample that exhibits a fringe shift pattern that changes over time as the sample is heated by the optical heat source system.

The camera converts samples of the interferometry beam into an electronic digital data stream containing samples of the fringe shift pattern measured over a period of time. The central processing unit correlates the samples of the fringe shift pattern into a tabulated list of thermally generated, time dependent changes in the optical path difference of the sample of the laser gain media.

It is an object of the invention to provide a diagnostic system for interferometrically determining the thermally induced changes in the optical path difference in samples of laser gain media.

It is another object of the invention to help predict the effects of thermal gradients, strain and thermal expansion from observations of OPD changes in laser gain media.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a diagnostic system for determining the thermally induced effects on the optical path of optically-pumped solid state lasers.

Figure 1:
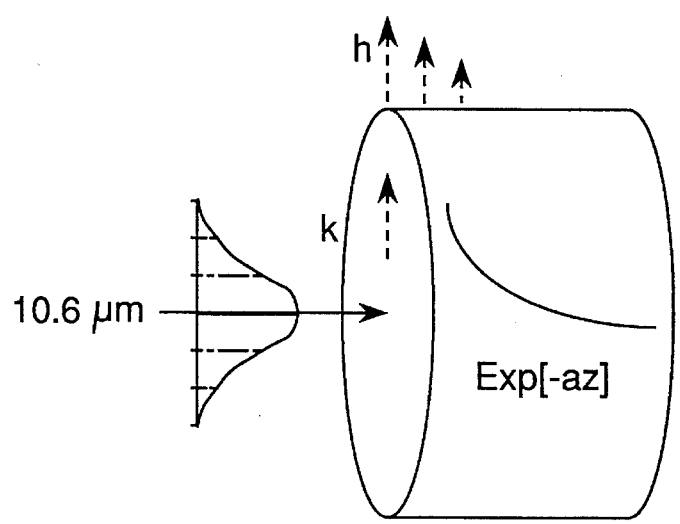
FIG. 1 is an illustration of the laser end-heated rod problem.

The reader's attention is now directed towards FIG. 1 which is an illustration of the laser end-heated rod problem. In FIG. 1 the 10.6 micron wave of a $CO_2$ laser is used to optically heat a glass rod. The pump beam acts as a Gaussian heat source with convective heat removal, because it represents a wide range of laser sources and boundary conditions.

Figure 2:
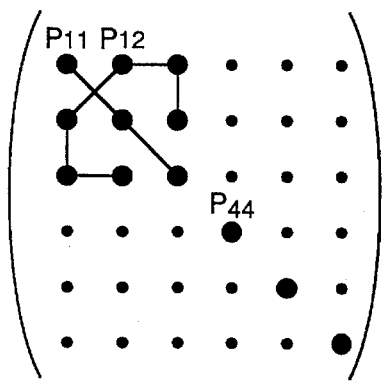
FIGS. 2 and 3 respectively illustrate the elasto-optic matrices for cubic and isotropic lattices.
Figure 3:
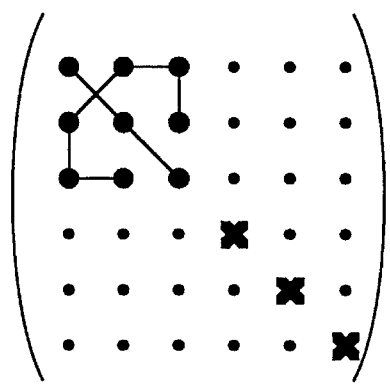

The strain induced refractive index and birefringence predicted in this model is applicable to isotropic materials such as glass, and to cubic crystals of classes 43m, 432, m3m such as YAG because the photoelastic matrix is similar to that of an isotropic material as seen in FIGS. 2 and 3.

FIGS. 2 and 3 are illustrations of the elasto-optic matrices (FIG. 2 is cubic; FIG. 3 is isotropic).

Figure 4:
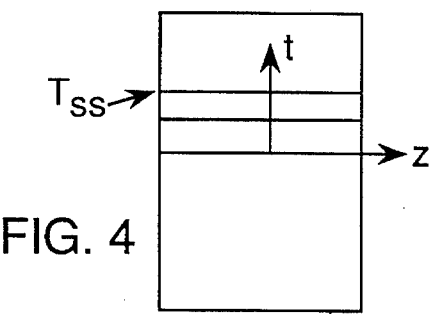
FIGS. 4 and 5 respectively illustrate the effect of Biot number on the transient temperature distribution in a rod with a line source (a) small, (b) large.
Figure 5:
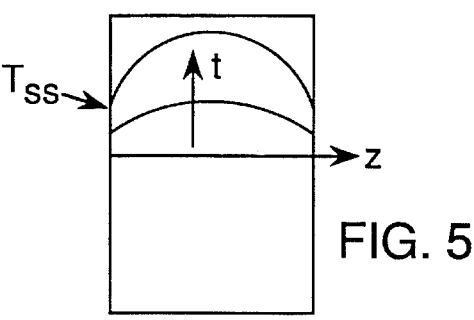
Figure 6:
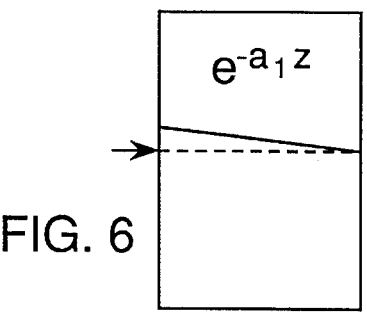
FIGS. 6 and 7 respectively illustrate pump beam absorption for Diode-pumped YAG rod, and a $CO_2$ heated glass rod.
Figure 7:
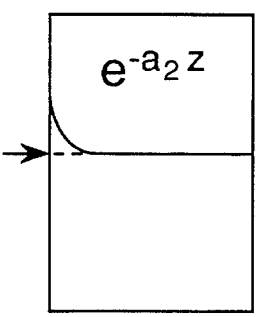

Axial heat conduction and heat removal was neglected for the following reason. Typical absorption profiles in an end-pumped rod allow the heat source to be treated as a line source with a constant axial temperature. These materials often have high thermal conductivity and no axial surface cooling, which makes for a small axial Biot number and allows the transient axial temperature to be treated as a constant. FIGS. 4 and 5 show the effect of small and large axial Biot numbers on the transient axial temperature profile generated by a line source in the center of a rod. For the case of a 10.6 μm source incident on BK7 glass the axial Biot number is also small, but pump beam absorption is much greater than in a typical system as shown in FIGS. 6 and 7. Although axial conduction is no longer small for this geometry, the axial temperature gradient is still less than the radial temperature gradient because there is more surface area in the radial direction. Furthermore, because the OPD depends on the axially integrated temperature, the axial gradient is not important to the final solution.

Figure 8:
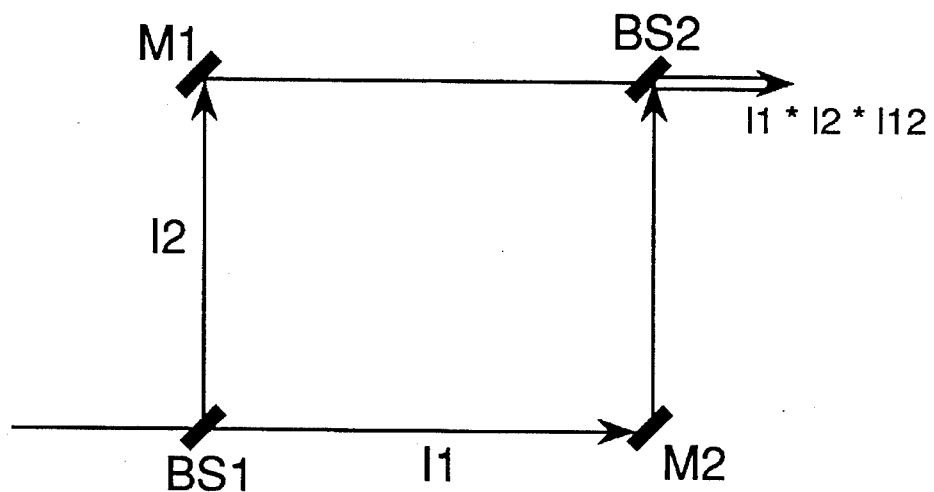
FIG. 8 is a diagram of the Mach-Zehnder interferometer geometry.

The selected diagnostic tool was a Mach-Zehnder interferometer in conjunction with a digital frame grabber and PC. This provided real time, two-dimensional, fringe counting method using the time axis. The Mach-Zehnder design is shown in FIG. 8. The collimated incident beam is split into beams $I_1$ and $I_2$ at beam splitter BS1, reflected by mirrors M1 and M2, and rejoined at BS2, producing the interference pattern. The object of interest can be placed in one leg of the interferometer, thus slightly altering the optical path traveled by that beam. This design was chosen because of its simplicity, i.e., there is only one pass through the sample, and because it allows the interference fringes to be imaged at the sample instead of the mirrors.

The utility of this device is demonstrated by heating a BK7 window with a $CO_2$ laser and allowing the fringes to walk off the boundaries as they are counted in a 2-D array. These results are compared to the predicted fringe shift distribution for the window using the time-dependent radial solution to the heat equation. The complete theory is discussed below in which the interferometer and the fringe counting code, is presented. This discussion compares these results to the predicted results generated from the model.

Figure 9:
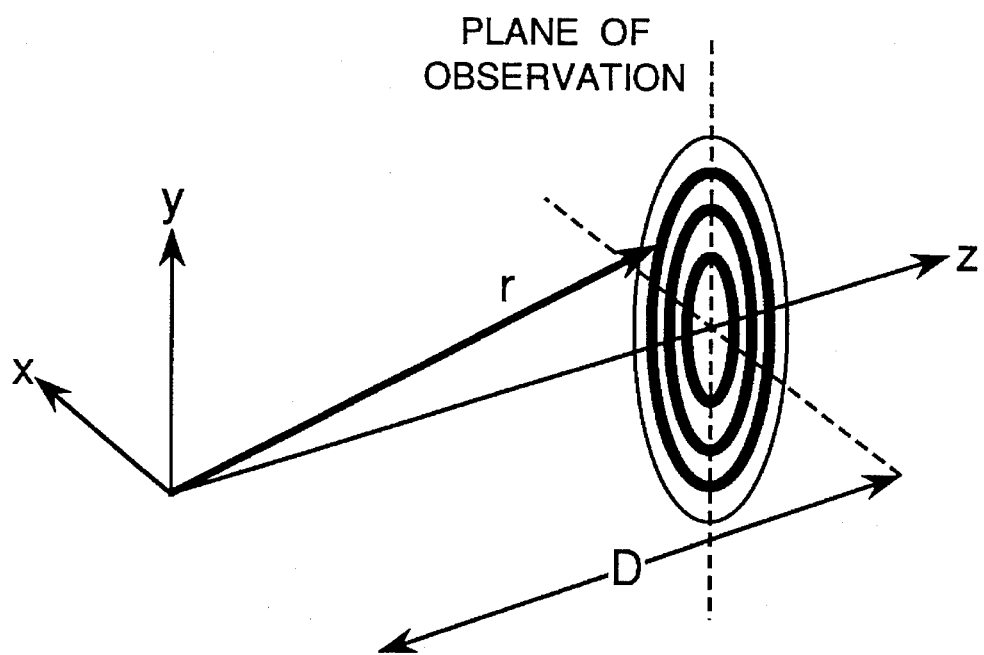
FIG. 9 is an illustration of the position vector and the plane of observation.

The Mach-Zehnder interferometer setup can be considered as simple two-beam interference with the interference taking place after the second beam splitter. Let the optical axis by the z axis and the plane of observation be the x–y plane, at a distance D from the output beam splitter as shown in FIG. 9. Each beam has a propagation vector k defining its direction of travel, and both beams share the same position vector r, which goes from the center of the output beam splitter to the point of observation on the observation plane.

The real part of the electric field of two waves $E_1$ and $E_2$ are described as $$E_1 = E_{01} \cos(k_1 r - \omega t + \phi_1) \quad (1)$$

and $$E_2 = E_{02} \cos(k_2 r - \omega t + \phi_2) \quad (2)$$

where $E_0$ is the amplitude, k is the propagation vector, r is the position vector, ω is the angular frequency, t is time, and φ is the phase angle. If the two waves are nearly parallel, the interference between them can be described by the total intensity observed at the point of interest. The intensity is defined as the time average of the electric field squared, $$I = \epsilon_0 c \langle E^2 \rangle, \quad (3)$$

where $\epsilon_0$ is the permittivity of free space and c is the speed of light. The total intensity is then $$I_{TOTAL} = \epsilon_0 c \langle E_1 + E_2 + 2 E_1 \cdot E_2 \rangle \quad (4)$$

which is just the superposition of two individual intensities plus an interference term as follows:

$$I_{TOTAL} = I_1 + I_2 + I_{12}, \quad (5)$$

where the interference term, $I_{12}$, is the unknown. By solving each of the time average terms in equation (4), one can express this in terms of the known quantitites $I_1$ and $I_2$.

Using the definitions of the electric field in equations (1) and (2), the interference term is $$I_{12} = 2\epsilon_0 c \langle E_1 \cdot E_2 \rangle = 2\epsilon_0 c \langle E_{01} \cdot E_{02} \cos(k_1 \cdot r - \omega t + \phi_1) \cos(k_2 \cdot r - \omega t + \phi_2) \rangle. \quad (6)$$

By using the identify $$\cos(x-y) = \cos x \cos y + \sin x \sin y \tag{7}$$

and letting $$x_i = k_i \cdot r + \phi_i, \quad i=1,2$$

$$y = \omega t \tag{8}$$

one can write $$I_{12} = 2\epsilon_0 c(E_{01} \cdot E_{02}[\cos x_1 \cos x_2 \cos^2 y + (\cos x_1 \sin x_2 + \sin x_1 \cos x_2)\cos y \sin y + \sin x_1 \sin x_2 \sin^2 y]). \tag{9}$$

Since the time average only involves the $\omega t$ terms, this becomes $$I_{12} = 2\epsilon_0 c E_{01} \cdot E_{02}[\cos x_1 \cos x_2 \langle \cos^2 y \rangle + (\cos x_1 \sin x_2 + \sin x_1 \cos x_2)\langle \cos y \sin y \rangle + \sin x_1 \sin x_2 \langle \sin^2 y \rangle]. \tag{10}$$

Solving for the time average parts of this equation, the $(\sin^2)$ term is $$\langle \sin^2 \omega t \rangle = \lim_{t \to \infty} \frac{1}{t} \int_{-\frac{t}{2}}^{\frac{t}{2}} \sin^2 \omega t \, dt =$$

$$\lim_{t \to \infty} \frac{1}{t} \left[ \frac{t}{2} - \frac{1}{4\omega} \sin(2\omega t) \right]_{-\frac{t}{2}}^{\frac{t}{2}} = \frac{1}{2},$$

the $(\cos^2)$ term is $$\langle \cos^2 \omega t \rangle = \lim_{t \to \infty} \frac{1}{t} \int_{-\frac{t}{2}}^{\frac{t}{2}} \cos^2 \omega t \, dt = \tag{12}$$

$$\lim_{t \to \infty} \frac{1}{t} \left[ \frac{t}{2} + \frac{1}{4\omega} \sin(2\omega t) \right]_{-\frac{t}{2}}^{\frac{t}{2}} = \frac{1}{2},$$

and the $(\cos \times \sin)$ term is $$\langle \cos \omega t \sin \omega t \rangle = \lim_{t \to \infty} \frac{1}{t} \int_{-\frac{t}{2}}^{\frac{t}{2}} \cos \omega t \sin \omega t \, dt = \tag{13}$$

$$\lim_{t \to \infty} \frac{1}{t} \left[ -\frac{1}{2\omega} \sin^2 \omega t \right]_{-\frac{t}{2}}^{\frac{t}{2}} = 0.$$

$I_{12}$ is then $$I_{12} = \epsilon_0 C E_{01} \cdot E_{02} (\cos x_1 \cos x_2 + \sin x_1 \sin x_2). \tag{14}$$

Applying identity (7), this becomes $$I_{12} = \epsilon_0 C E_{01} \cdot E_{02} \cos(x_1 - x_2). \tag{15}$$

Using the definition of $x_1$ and $x_2$, the interference term is $$I_{12} = \epsilon_0 C E_{01} \cdot E_{02} \cos[(k_1 - k_2) \cdot r + (\phi_1 - \phi_2)]. \tag{16}$$

Let $$\delta = (k_1 - k_2) \cdot r + (\phi_1 - \phi_2) \tag{17}$$

be the phase difference. The dot product of $E_{01}$ and $E_{02}$ is $$E_{01} \cdot E_{02} = E_{02} E_{02} \cos \Theta, \tag{18}$$

where $\Theta$ is the angle between the k vectors. Then $$I_{12} = \epsilon_0 C E_{02} E_{02} \cos \delta \cos \Theta. \tag{19}$$

Following a similar procedure for the other terms of equation (5), $I_1$ is $$I_1 = \epsilon_0 c \langle E_1^2 \rangle = E_{01}^2 \langle \cos^2[(k \cdot r + \phi) - \omega t] \rangle. \tag{20}$$

Again using identity (7), this becomes $$I_1 = \epsilon_0 c E_{01}^2 \langle \cos^2 x (\cos^2 y) + 2 \cos x \sin x (\cos y \sin y) + \sin^2 x (\sin^2 y) \rangle. \tag{21}$$

By using equations (11–13), $I_1$ becomes $$I_1 = \epsilon_0 c E_{01}^2 (1/2 \cos^2 x + 0 + \frac{1}{2} \sin^2 x) = \frac{1}{2} \epsilon_0 c E_{01}^2 = 1/2 \epsilon_0 c E_{01}^2. \tag{22}$$

Similarly, $$I_2 = \epsilon_0 c \langle E_2^2 \rangle = 1/2 \epsilon_0 c E_{02}^2. \tag{23}$$

Solving for $E_{01}E_{02}$ gives $$E_{01} E_{02} = \frac{2}{\epsilon_0 c} \sqrt{I_1 I_2}. \tag{24}$$

Finally, the interference term is $$I_{12} = 2\sqrt{I_1 I_2} \cos \delta \cos \Theta, \tag{25}$$

where $\Theta$ is small and $\cos \Theta = 1$. Substituting this term into equation (5) and dropping the cos term, the total intensity is:

$$I_{TOTAL} = I_1 + I_2 + 2\sqrt{I_1 I_2} \cos \delta. \tag{26}$$

If the two intensities are equal, this equation reduces to $$I_{TOTAL} = 2I_0 (1 + \cos \delta). \tag{27}$$

The above equation describes the intensity observed at a point defined by $\delta$, the phase difference.

As shown in equation (17), $\delta$ depends on the individual k-vectors and phase angles of the interfering beams. Assume $k_1$ is parallel to the optical axis (z axis) of our system and $k_2$ is slightly non-parallel in the y direction by the angle $\Theta$. In rectangular coordinates $$k_1 = \frac{2\pi}{\lambda} (0,0,1) \tag{28}$$

and $$k_2 = \frac{2\pi}{\lambda} (0, \sin\theta, \cos\theta), \tag{29}$$

where $\lambda$ is the wavelength of the interfering beams. The position vector is the vector from the output beam-splitter to the point of observation and is $$r = (x, y, D), \tag{30}$$

where D is the distance to the observation plane. So $$k_1 - k_2 = \frac{2\pi}{\lambda} (0, -\sin\theta, 1 - \cos\theta) \tag{31}$$

and $$(k_1 - k_2) \cdot r = \frac{2\pi}{\lambda} [D(1 - \cos\theta) - y\sin\theta]. \tag{32}$$

To find the difference in phase angles, $\phi_1 - \phi_2$, one must compare the optical paths traveled by the light in the two legs of the interferometer. With nothing in either leg of the interferometer there is only the additional distance traveled by light in one leg d. The difference in phase angles is $$\phi_1 - \phi_2 = \frac{2\pi}{\lambda} d. \tag{33}$$

By adding a sample of index na and length L to the same leg, one must replace a length L by n L in one leg, increasing the OPD by L(n−1) as follows:

$$\phi_1 - \phi_2 = \frac{2\pi}{\lambda} [d + L(n-1)]. \tag{34}$$

If this sample were heated, the integrated temperature difference in the z-direction would cause an additional OPD change, which is assumed to be linear. This is described as $$\phi_1 - \phi_2 = \frac{2\pi}{\lambda} \left[ d + L(n-1) + \frac{dn}{dT} \int_0^L T(r,t)dz \right], \tag{35}$$

where T is the temperature distribution. Note that once this term is integrated, it will have units of K×m while dn/dT has units of 1/K, thus remaining consistent with the other optical path differences.

The temperature distribution causes the material to physically expand in the z-direction by an amount ΔL. The length term must be modified as follows:

$$\phi_1 - \phi_2 = \frac{2\pi}{\lambda} \left[ d + (L + \Delta L)(n-1) + \frac{dn}{dT} \int_0^L Tdz \right]. \tag{36}$$

Finally, there is an OPD dependence on the strain itself. The difference in phase angles is then $$\phi_1 - \phi_2 = \tag{37}$$

$$\frac{2\pi}{\lambda} \left[ d + (L + \Delta L)(n-1) + \frac{dn}{dT} \int_0^L Tdz + \Delta OPD_\epsilon \right],$$

where ΔOPD is polarization dependent and a function of the components of the integrated strain distribution, ε. This term, as well as the increase in length, will be discussed in more detail after solving for the temperature and strain components.

Substituting equations (32) and (37) into equation (17), the phase difference is now $$\delta = \frac{2\pi}{\lambda} \left[ D(1 - \cos\theta) - y\sin\theta + d + \right. \tag{38}$$

$$\left. (L + \Delta L)(n-1) + \frac{dn}{dT} \int_0^L Tdz + \Delta OPD_\epsilon \right].$$

To find the number of fringes with will generate for a given position over time, the number of $2\pi$ phase changes δ undergoes must be known. The change in phase difference is $$\Delta\delta = \frac{2\pi}{\lambda} \left( \Delta L(n-1) + \frac{dn}{dT} T_z + \Delta OPD_\epsilon \right) = 2\pi f, \tag{39}$$

where $T_z = \int T(r,t)dz$, and f is the number of fringes which pass a given position over time. Rearranging terms gives $$f = \frac{1}{\lambda} \left( \Delta L(n-1) + \frac{dn}{dT} T_z + \Delta OPD_\epsilon \right), \tag{40}$$

where the total OPD change is f×λ.

Since strains are generated by the temperature gradient, it is natural to first find the time-dependent temperature distribution generated in the sample from the laser source. Finding the temperature distribution demands a solution to the heat conduction equation for given boundary conditions.

Typical end-pumped laser media are rod shaped, as is the BK7 window, implying cylindrical boundary conditions.

The total heat conduction equation is:

$$\frac{\partial^2 T(r,t)}{\partial r^2} + \frac{1}{r} \frac{\partial T(r,t)}{\partial r} + \frac{g(r,z)}{k} = \frac{\rho c_p}{k} \frac{\partial T(r,t)}{\partial t}, \tag{41}$$

where g is the spatially dependent source, k is the thermal conductivity, ρ is the mass density, and $C_p$ is the specific heat of the sample. The boundary conditions for this experiment were convective $$\frac{\partial T}{\partial r} + \frac{h}{k} T = 0, \quad r = a, \tag{42}$$

where h is the heat transfer coefficient. The zero on the right hand side of this equation indicates that the solution is only for the temperature rise above ambient, not the actual temperature.

It is known that for time-independent sources and boundary conditions, the time-dependent solution with heat generation can be broken into a steady-state problem with heat generation and a homogeneous problem without heat generation where the total solution is $(T(r,t) = T_s(r) + T_h(r,t)$. The steady-state equation is $$\frac{\partial^2 T_s(r)}{\partial r^2} + \frac{1}{r} \frac{\partial T_s(r)}{\partial r} + \frac{g(r,z)}{k} = 0 \tag{43}$$

and the homogeneous equation is $$\frac{\partial^2 T_h(r,t)}{\partial r^2} + \frac{1}{r} \frac{\partial T_h(r,t)}{\partial r} = \frac{\rho c_p}{k} \frac{\partial T_h(r,t)}{\partial t}, \tag{44}$$

with an initial condition of $T_h(r,0) = F(r) - T_s(r)$, where F(r) is the initial temperature distribution and $T_s(r)$ is the steady-state solution. Since interest lies only in the temperature rise above ambient, F(r) is set equal to zero.

Since the experiment uses a $TEM_{00}$ $CO_2$ laser as a heat source, it is reasonable to assume that the source is Gaussian in nature and centered on the z-axis as follows;

$$g(r,z) = \frac{2P\alpha_\lambda}{\pi w^2} \exp\left(-2\frac{r^2}{w^2}\right) e^{-\alpha\lambda z}, \tag{45}$$

where P is the incident laser power, $r = (x^2+y^2)^{1/2}$, w is the 1/e radius of the source, and $\alpha_\lambda$ is the absorption coefficient of the sample. If the end-pumping resulted in the rod lasing, the incident power would have to be modified by a factor of $1 - \eta\times\lambda_p/\lambda_1)$, where η is the quantum efficiency of the pumping process, $\lambda_p$ is the pump wavelength and $\lambda_1$ is the laser wavelength.

$T_s(r)$, can be reduced to $$T_s(r) = \frac{2P}{\pi} \alpha e^{-\alpha z} \left\{ \frac{1}{4ah} \left[ 1 - \exp\left(-2\frac{r^2}{w^2}\right) \right] + \right. \tag{46}$$

$$\left. \frac{1}{8k} \left[ Ei\left(-2\frac{r^2}{w^2}\right) - Ei\left(-2\frac{a^2}{w^2}\right) + \ln\left(\frac{a^2}{r^2}\right) \right] \right\},$$

Where Ei(x) is the exponential integral function. In most cases, including this one, $Ei(-2a^2/w^2)$ is small compared to $Ei(-2r^2/w^2)$ and $\ln(a^2/r^2)$ for r<a. Near r=a, all of these terms are negligible. For this reason, $Ei(-2a^2/w^2)$ can be neglected for all values of r.

The time-dependent homogeneous solution was solved by Ozisik in ref. 17 for a cylinder with radial conduction which dissipates heat by convection as $$T_h(r,t) = \tag{47}$$

-continued $$\frac{2}{a^2} \sum_{m=1}^{\infty} \exp\left(-\frac{k}{\rho c_p} \beta_m^2 t\right) \frac{\beta_m^2 J_0(\beta_m r)}{(\beta_m^2 + h^2/k^2) J_0^2(\beta_m a)} \times$$

$$\int_0^a r' J_0(\beta_m r') T_h(r', 0) dr',$$

where $J_0(x)$ is a zero order Bessels function of the first kin, the $B_m$'s are the positive roots of the equation $$\beta_m J_1(\beta_m a) = h/k \, J_0(\beta_m a), \tag{48}$$

and $T_h(r',0)$ is $-T_s(r')$ as discussed previously.

Integrating the constant term times $r \, J_0(\beta_m r)$ plus the r-dependent term times $r \, J_0(\beta_m r)$, yields $$-\int_0^a T_s(r') r' J_0(\beta_m r') dr' = \tag{49}$$

$$-\frac{2P}{\pi} \alpha e^{-\alpha z} \left\{ \frac{1}{4h} \left[1 - \exp\left(-2\frac{a^2}{w^2}\right)\right] \frac{J_1(\beta_m a)}{\beta_m} + \right.$$

$$\left. \frac{1}{8k} \int_0^a r' J_0(\beta_m r') \left[ Ei\left(-2\frac{r'^2}{w^2}\right) + \ln\left(\frac{a^2}{r'^2}\right) \right] \right\},$$

where the second term must be integrated numerically. The total time-dependent solution is now $$T_h(r,t) = -\frac{2P}{\pi} \alpha e^{-\alpha z} \frac{2}{a^2} \sum_{m=1}^{\infty} \exp\left(-\frac{k}{\rho c_p} \beta_m^2 t\right) \frac{\beta_m^2 J_0(\beta_m r)}{(\beta_m^2 + h^2/k^2) J_0^2(\beta_m a)} \times \tag{50}$$

$$\left\{ \frac{1}{4h} \left[1 - \exp\left(-2\frac{a^2}{w^2}\right)\right] \frac{J_1(\beta_m a)}{\beta_m} + \frac{1}{8k} \int_0^a r' J_0(\beta_m r') \left[ Ei\left(-2\frac{r'^2}{w^2}\right) + \ln\left(\frac{a^2}{r'^2}\right) \right] \right\}$$

and the total temperature distribution, $T(r,t)$, is found by adding equations (46) and (50).

The integrated temperature distribution, $T_z(r,t)$, in the axial direction is found by factoring out the exponential term and integrating in the following manner $$\int_0^L \alpha\lambda e^{-\alpha\lambda z} dz = (1 - e^{-\alpha\lambda L}). \tag{51}$$

The final form for the total temperature distribution integrated in the z-direction is $$T_z(r,t) = \frac{2P}{\pi}(1-e^{-\alpha\lambda L})\left\{ \frac{1}{4ah}\left[1 - \exp\left(-2\frac{r^2}{w^2}\right)\right] + \right. \tag{52}$$

$$\frac{1}{8k}\left[ Ei\left(-2\frac{r^2}{w^2}\right) + \ln\left(\frac{a^2}{r^2}\right) \right] +$$

$$\frac{2}{a^2}\sum_{m=1}^{\infty}\exp\left(-\frac{k}{\rho c_p}\beta_m^2 t\right)\frac{\beta_m^2 J_0(\beta_m r)}{(\beta_m^2 + h^2/k^2)J_0^2(\beta_m a)} \times$$

$$\left\{ \frac{1}{4h}\left[1 - \exp\left(-2\frac{r^2}{w^2}\right)\right]\frac{J_1(\beta_m a)}{\beta_m} + \right.$$

$$\left.\left. \frac{1}{8k}\int_0^a r' J_0(\beta_m r')\left[ Ei\left(-2\frac{r'^2}{w^2}\right) + \ln\left(\frac{a^2}{r'^2}\right) \right] \right\} \right\}.$$

The above equation leads directly to the temperature-induced OPD change. Next, the strain distributions need to be solved in order to find the OPD dependence on strain.

Thermal strains are related to the thermal stresses, which are in turn related to the temperature distribution itself. The stress-strain relationships in cylindrical coordinates are $$\epsilon_r = 1/E[\sigma_r - \nu(\sigma_\phi + \sigma_z)] + \alpha_T T_z,$$

$$\epsilon_\phi = 1/E[\sigma_\phi - \nu(\sigma_r + \sigma_z)] + \alpha_T T_z,$$

and $$\epsilon_z = 1/E[\sigma_z - \nu(\sigma_r + \sigma_\phi)] + \alpha_T T_z, \tag{53}$$

where E is the modulus of elasticity, $\nu$ is Poisson's ratio, $\sigma$ is the stress, $\alpha_T$ is the thermal expansion coefficient, and all stresses and stains are functions of r and t and represent integrated quantities in the z-direction.

The stress distributions for an isotropic rod with a radial temperature distribution and unclamped ends are $$\sigma \frac{\alpha_T E}{(1-\nu)}\left(\frac{1}{a^2}\int_0^a T_z r dr - \frac{1}{r^2}\int_0^r T_z r dr\right), \tag{54}$$

$$\sigma \frac{\alpha_T E}{(1-\nu)}\left(\frac{1}{a^2}\int_0^a T_z r dr + \frac{1}{r^2}\int_0^r T_z r dr - T_z\right),$$

-continued $$\sigma \frac{\alpha_T E}{(1-\nu)}\left(\frac{2}{a^2}\int_0^a T_z r dr - T_z\right) = \sigma_r + \sigma_\phi.$$

By substituting $\sigma_r + \sigma_\phi$ for $\sigma_z$, the strain equations can be reduced to $$\epsilon_r = \frac{1}{E}[\sigma_r(1-\nu) - 2\nu\sigma_\phi] + \alpha_T T_z, \tag{55}$$

$$\epsilon_\phi = \frac{1}{E}[\sigma_\phi(1-\nu) - 2\nu\sigma_r] + \alpha_T T_z,$$

and $$\epsilon_z = \frac{1}{E}[\sigma_z(1-\nu)] + \alpha_T T_z = \alpha_T \frac{2}{a^2}\int_0^a T_z r dr,$$

where the axial strain, $\epsilon_z$, turns out to be constant.

It remains to find the integral from 0 to a and 0 to r of $T_z r dr$. These were solved by integrating the steady-state and time-dependent parts of the temperature distribution separately. The solutions are $$\frac{1}{a^2} \int_0^a T_z r \, dr = \frac{2P}{\pi} (1 - e^{\alpha \lambda L}) \left\{ \left( \frac{1}{8ah} - \frac{w^2}{32ka^2} \right) \left[ 1 - \exp\left( -2\frac{a^2}{w^2} \right) \right] + \right.$$

$$\frac{1}{16k} \left[ 1 + Ei\left( -2\frac{a^2}{w^2} \right) \right] + \frac{2}{a^3} \sum_{m=1}^{\infty} \exp\left( -\frac{k}{\rho c_p} \beta_m^2 t \right) \frac{\beta_m J_1 (\beta_m a)}{(\beta_m^2 + h^2/k^2) J_0^2 (\beta_m a)} \times$$

$$\left. \left\{ \frac{1}{4h} \left[ 1 - \exp\left( -2\frac{a^2}{w^2} \right) \right] \frac{J_1(\beta_m a)}{\beta_m} + \frac{1}{8k} \int_0^a r' J_0(\beta_m r') \left[ Ei\left( -2\frac{r'^2}{w^2} \right) + \ln\left( \frac{a^2}{r'^2} \right) \right] \right\} \right\} \quad (56)$$

and $$\frac{1}{r^2} \int_0^r T_z r \, dr = \frac{2P}{\pi} (1 - e^{\alpha \lambda L}) \left\{ \frac{1}{8ah} \left[ 1 - \exp\left( -2\frac{a^2}{w^2} \right) \right] - \frac{w^2}{32kr^2} \left[ 1 - \exp\left( -2\frac{r^2}{w^2} \right) \right] + \right.$$

$$\frac{1}{16k} \left[ 1 + Ei\left( -2\frac{r^2}{w^2} \right) + \ln\left( \frac{a^2}{r^2} \right) \right] + \frac{2}{a^3} \sum_{m=1}^{\infty} \exp\left( -\frac{k}{\rho c_p} \beta_m^2 t \right) \frac{\beta_m J_1 (\beta_m a)}{(\beta_m^2 + h^2/k^2) J_0^2 (\beta_m a)} \times$$

$$\left. \left\{ \frac{1}{4h} \left[ 1 - \exp\left( -2\frac{a^2}{w^2} \right) \right] \frac{J_1(\beta_m a)}{\beta_m} + \frac{1}{8k} \int_0^a r' J_0(\beta_m r') \left[ Ei\left( -2\frac{r'^2}{w^2} \right) + \ln\left( \frac{a^2}{r'^2} \right) \right] \right\} \right\}, \quad (57)$$

where $Ei(-2a_2/w_2)$ of equation (56) can be neglected as previously discussed.

These two equations can easily be plugged into the stress equations (54), which in turn can be used in the strain equations (53) or (55).

Experiments have found the OPD dependence on the strains by solving for the refractive index dependence on the relative dielectric impermeability tensor. The solutions are $$\Delta OPD_\epsilon^r = -n^3/12[p_{11}(3\epsilon_r + \epsilon_\phi + 2\epsilon_z) + p_{12}(3\epsilon_r + 5\epsilon_\phi + 4\epsilon_z) + p_{44}(6\epsilon_r - 2\epsilon_\phi - 4\epsilon_z)],$$

and $$\Delta OPD_\epsilon^\phi = -n^3/12[p_{11}(\epsilon_r + 3\epsilon_\phi + 2\epsilon_z) + p_{12}(5\epsilon_r + 3\epsilon_\phi + 4\epsilon_z) - p_{44}(2\epsilon_r - 6\epsilon_\phi + 4\epsilon_z)], \quad (58)$$

where the superscripts indicate the polarization of the probe beam and the p's are the elasto-optic coefficients. These can be positive or negative depending whether they were measured using a compressive stress or a tensile stress. As shown in FIG. 2, for isotropic glass $p_{44} = \frac{1}{2}(p_{11} - p_{12})$.

The birefringence is the difference in OPD between the two polarizations, given by $$(\Delta OPD_\epsilon^r - \Delta OPD_\epsilon^\phi) = n^3/2(p_{11} - p_{22})(\epsilon_r - \epsilon_\phi). \quad (59)$$

Koechner [1] showed that the physical elongation of a laser end-pumped rod is $$\Delta L = \alpha_T L_0 T(r), \quad (60)$$

where $\alpha_T$ is the thermal expansion coefficient, $T(r)$ is the temperature distribution, and $L_0$ is the length of rod over which expansion occurs. He experimentally determined $L_0$ is the length of rod over which expansion occurs. He experimentally determined $L_0$ for YAG to be approximately equal to a, the rod radius.

Equation (60) can be modified for a z-dependent temperature distribution as follows:

$$\Delta L = \alpha_T \frac{L_0}{L} \int_0^L T dz. \quad (61)$$

For this case, 1 cm thick glass with a 10.6 μm heat source, $L_0$ depends on where the heat is concentrated. Since glass absorbs 10.6 μm radiation very quickly, most of the heat is located on the front surface of the rod. The absorption coefficient, $\alpha_\lambda$, is typically not published since for any practical glass thickness, no 10.6 μm is transmitted. By using a very thin piece of glass, $\alpha_\lambda$ was measured to be approximately 3.3 mm$^{-1}$. This means that 90% of the source beam is absorbed within 0.7 mm of the surface ($0.10 = e^{-z}$). During the time period of interest, the first minute of heating, no significant amount of conduction has occurred and only the front part of the sample is subject to expansion. $L_0$ is therefore less than 1 mm for all practical purposes. In equation (40) the expansion coefficient, $\alpha_T$ is about twice $dn/dT$, and $(n-1) = \frac{1}{2}$. This means that the first term, $\alpha_T (L_0/L) T_z \times (n-1)$, is 10 times smaller than the second term, $dn/dT$ $T_z$, and will be neglected.

The above model has the capability to predict the time-dependent temperature distribution, stresses, and strains in a rod heated by a Gaussian source and cooled by convection, as well as the time-dependent fringe pattern if this rod were placed in one leg of a Mach-Zehnder interferometer.

Figure 10:
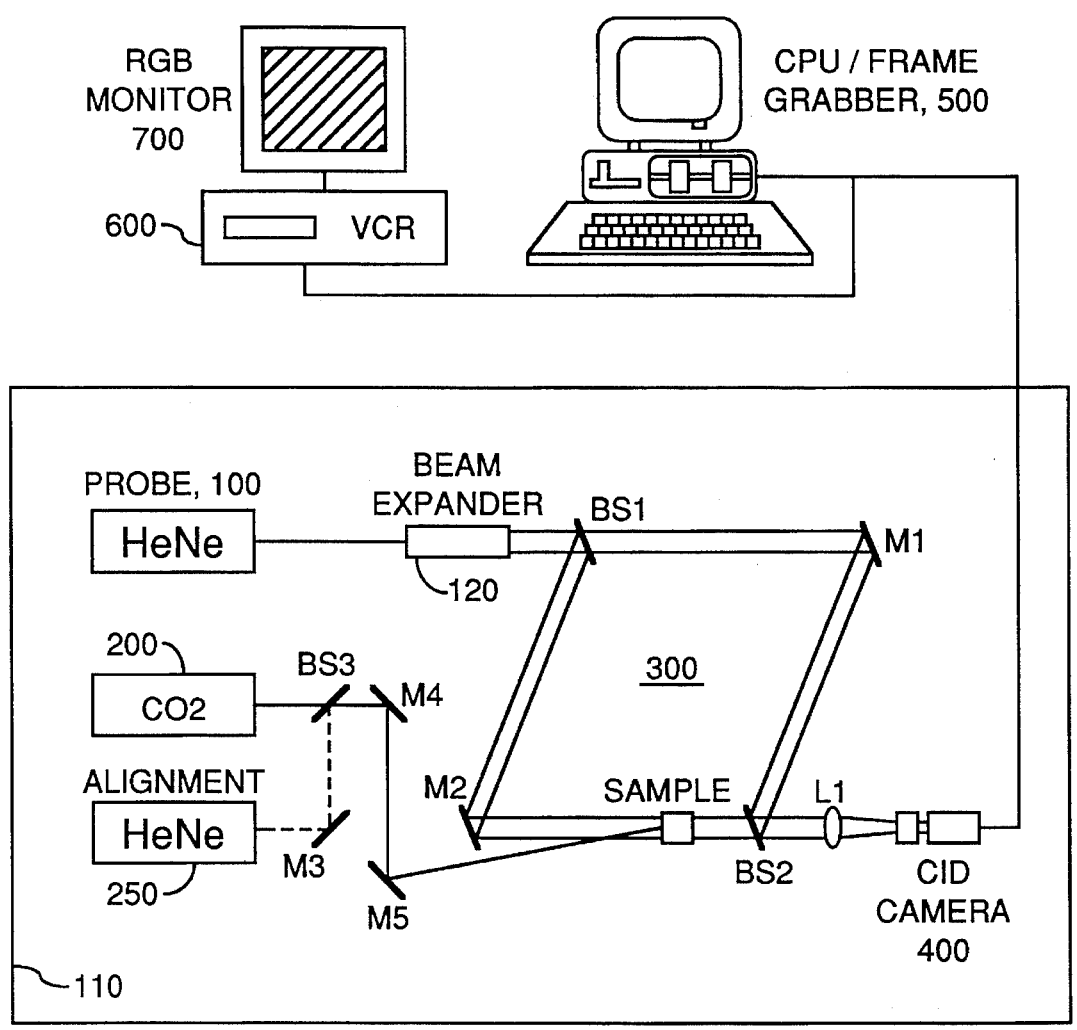
FIG. 10 is an illustration of the invention used as an interferometric diagnostic system for a sample of a laser gain media.

The reader's attention is now directed at FIG. 10, which is an illustration of an embodiment of the invention as an interferometric based diagnostic system for determining the time dependent change in the optical path difference in an optically heated sample of a laser gain media using: a probe beam laser 100 an optical heat source system, an interferometer 300, camera 400, and a central processing unit 500.

In one example the sample used is a BK7 silicon window, but the sample may be any crystalline laser gain media: Ni:YAG, Ni:Glass, N2:YLF etc.

In operation, the probe beam laser 100 emits a probe beam which is split and directed through the sample under test by the interferometer while the sample is optically heated by the optical heat source system. In FIG. 10, the optical heat source system contains a $CO_2$ laser 200, an alignment HeNe laser 250 three mirrors M3M4M5, and a beam splitter B53 used to combine the alignment beam and the $CO_2$ beam.

The interferometer is a Mach-Zehnder interferometer that contains two beam splitters and two mirrors to split and direct the probe beam into the sample laser gain media, and output an interferometry beam through the sample that exhibits a fringe shift pattern that changes over time as the sample is heated by the optical heat source system.

The camera 400 converts samples of the interferometry beam into an electronic digital data stream containing samples of the fringe shift pattern measured over a period of time. The central processing unit 500 correlates the samples of the fringe shift pattern into a tabulated list of thermally generated, time dependent changes in the optical path difference of the sample of the laser gain media.

The system of FIG. 10 is an interferometric based diagnostic for experimentally determining the time-dependent OPD change in an optically heated media was developed. This device is demonstrated by heating a glass (BK7) window with a $CO_2$ laser, effectively simulating high power end-pumping in a rod. Temporal OPD changes are measured by automated counting of interference fringes as they are generated by the thermal effects.

A two-dimensional, time-dependent model is developed to describe the radial temperature distribution in a cylinder, the stress and strain distributions, the thermal expansion, and the associated OPD change caused by a Gaussian heat source. This compared to the experimental data for the BK7 window to determine the validity of the approximations and its usefulness for other systems. Good agreement between the model and experiment, within 10 percent was observed.

FIG. 10 is an illustration of an embodiment of the invention. All of the optics and lasers were mounted on a $4 \times 8$ ft$^2$ Newport nitrogen suspended optical table.

The probe beam was generated by an Aerotech model 110SF/D/D, 1 mW, vertically polarized, frequency stabilized HeNe. For clean imaging frequency stability was important because it allowed only one longitudinal mode to oscillate in the probe beam. The HeNe beam was attenuated with wedge beam splitters (not shown) to avoid saturating the camera. It was then expanded to 5 cm diameter with the beam expander.

The interferometer was made up of beam splitters BS1 and BS2, and mirrors M1 and M2. The beam splitters 5 cm in diameter and AR-coated on one side for 633 nm at 45° so that no additional fringes would be generated by an etalon effect. All beam splitters and mirrors were mounted on micro-positioning mounts with 2 degrees of freedom.

A Mach-Zehnder interferometer need not be rectangular in shape; this particular design was configured to allow the expanded beam to propagate through all of the mirrors without clipping. The deviation from 45° did not create an etalon effect or adversely affect fringe visibility.

In order to accurately count fringes, the interferometer needed to be stable over the time period of sample heating. Small air currents from air conditioning or equipment fans can slightly change the refractive index of the air in the interferometer's beam path, and were found to affect the fringe counting capability. To remedy this situation, the entire setup was enclosed with a flat metal roof, the same dimensions as the optical table and held in place by unistrut, and plastic sliding doors on all four sides of the table. Under these conditions, the interferometer remained visibly stable for at least 30 minutes. Background noise remained below the pixel resolution and stray lighting was shielded by the enclosure.

The BK7 sample was mounted to allow free convection on all boundaries and inserted 15 cm from BS2 to make more room for the heat source and to make it easier to image the sample at the camera with lens L1. A 15 cm focal length lens was used for this purpose. The camera was a CIDTEC CID camera with a 50 cm lens.

The heat source was a Synrad Model 48-2 20 W $CO_2$ laser. The laser was single transverse mode (TEM$_{00}$), linearly polarized, had a pulse repetition frequency of 5 kHz, and had a 3 mm beam diameter with a 5 mradian divergence. Laser power fluctuations were as much as ±2% with cooling.

A 0.1 mW HeNe was used for $CO_2$ alignment. BS3 was designed to reflect 633 nm radiation and pass 10.6 nm radiation. M4 and M5 were used to precisely direct the $CO_2$ toward the sample.

During data acquisition the fringe pattern was viewed on a Sony PVM-1344Q trinitron RGB monitor and recorded on a Mitsubishi BV-1000 SVHS recorder for playback/analysis at a later time. The computer and frame grabber were used to reduce the data and required digitizing the images at 10 frames/second and counting the fringe shifts at as many points as possible. A Data Translation 2861 frame grabbing board with 512×512 resolution was used to digitize the images. Borland C was used on a 80486 based computer to control the frame grabber and analyze the fringe pattern.

A typical experiment involved aligning the interferometer so that one bright fringe covered the sample's center. This image was recorded for approximately 30 seconds on the video recorder as background data. At this time, the $CO_2$ was turned on and recording continued for another 60 seconds until the fringe shifting rate slowed considerably. The laser was shut off and recording continued for 30 more seconds.

The C code and frame grabber were central to the development of the real time fringe counting capability. The code prompted the user to select input from either the VCR or camera directly. When this was done, the user could start the frame grabber to look at incoming background data. When the background data was nearly finished, the user could stop the frame grabber and outline the sample by moving a cursor around the monitor screen with the number pad. At this time the code determined the initial values of the pixels to be sampled. Pixels were selected by dividing the outlined sample into a grid with n+1×n+1 boxes with the n×n pixels occurring at the intersection of the boxes. The tradeoff in determining n was resolution vs. speed. With the current fringe counting scheme and computer, it was possible to capture a 9×9 fringe shift array. The user had the option of saving the unperturbed fringe pattern and/or continuing. If <continue> was selected, the user then resumed playback and frame acquisition and watched the frames on the RGB monitor and the center pixel value on the computer screen.

During this time the computer counted integer fringe shifts at each of the n×n pixels using an algorithm developed in C and Data Translation Corporation's DT-IRIS command language. After the desired time the user paused the VCR and frame grabber and the code interpolated a fractional fringe shift for each pixel and added this to the integer fringe shift which had been counted up to this point. The user again had the option to save the image and/or continue. If <save> was selected, the n×n array of fringe shifts was stored automatically in n×n bytes.

In order to keep the fringe counting algorithm simple and, therefore, fast it was better to set up the interferometer so that a single bright fringe encompassed the entire sample. The tradeoff between this single initial fringe method as opposed to several initial fringes is code speed and simplicity versus resolution at low temperatures and ease of alignment. Naturally, it was harder to align the interferometer allowing only one bright fringe. Also the single fringe method was not useful until the heating had caused a dark fringe to appear, while several initial fringes could allow fractional fringe shifts to be measured even at lower temperatures. Since only large temperature gradients were investigated, the single fringe method was acceptable.

The fringe counting algorithm worked by comparing the current pixel value at each array point to the initial pixel values at that point. Assuming the initial pixel value was from a bright fringe, then the current pixel value could be monitored for a drop below a certain threshold which was selected to be 5% below the initial pixel value. This drop in pixel value occurred when a dark fringe swept by due to increased heating. The code continually updated a minimum pixel value until the slope changed. When the pixel value again crossed the threshold, the code searched for another slope change and counted a fringe shift of one. This continued until the frame grabber was stopped. At this time the code determined the current pixel value and compared this to the initial pixel value and whether the pixel had just passed through a minimum or not. This gave a good approximation of any fractional fringe shift that had occurred. This was added to the summation of integer fringe shifts which occurred before the frame grabber was stopped.

The fringe counting algorithm was designed to minimize errors; however, because of the requirement to wait until a pixel value had dropped 5% below a maximum value or had risen to 5% above a minimum, there was a 10% 'slope' error.

Additional error could have occurred when estimating the fractional fringe shift because it was necessary to use the previous minimum and maximum pixel values. Due to thermal lensing these intensity minimum and maximum values could change as much as 20% from one fringe to the next, mainly near the center of heating. This made an additional 40% 'amplitude' error possible, bringing the total possible error to 50%, or ½ a fringe.

Observation confirmed that the total fringe count error was less than half a fringe unless one of two things occurred. Since the fringe counting algorithm did not discriminate between fringes going one direction and fringes going the opposite direction, fluctuations in the $CO_2$ laser power could cause fringe pattern fluctuations. This condition occasionally caused extra fringes to be counted near the center of the heating where fringes were thinnest. Laser cooling helped to minimize fringe fluctuations.

Another problem in fringe counting took place in the first seconds of heating, again near the center. The first fringe that appeared moved rapidly and could sometimes be missed by the fringe counting algorithm. This problem could be prevented in most cases by adjusting the fringe counter sensitivity (threshold). In either case it was important to watch the computer screen, which showed both the time history of the center pixel value and the integer fringe count being continuously updated. Any discrepancies could be accounted for and the sensitivity of the code could be adjusted. Fringe counting errors away from the center of the heating were much less common until the temperature rise slowed enough to allow laser fluctuations to become significant.

To accurately predict the index change in the $CO_2$ end-heated BK7 window, realistic values are needed for the constants discussed above. Table 1 defines these constants and gives the values used in the equations. All values were either measured, estimated, or come from literature in the art. Table 1 Numerical values used in the model.

TABLE 1

```c
/* AUTOMATED TEMPORAL FRINGE COUNTING PROGRAM */

/* written in Borland C */
/* by Dana C. Kopf */
/* August 1993 */

/* INCLUDE FILES */ include <stdio.h>           /* standard I/O */
include <conio.h>           /* interactive I/O */
#include <string.h>          /* string commands */
#include <time.h>            /* enables clock */
#include <dos.h>             /* dos commands */
#include <graphics.h>        /* graphics commands */
#include "isdefs.h"          /* framegrabber commands */
#define s 9                  /* array size */

/* SUBROUTINES */ int saveframe(void);
int savefringe(void);
int savevis(void);
int cursor(void);

/* GLOBAL VARIABLE DECLARATIONS */ int r2, c2, h2, w2;          /* integers */
int a = 5;                   /* array row */
int b = 5;                   /* array column */
int channel = 0;             /* multiplexer channel */
int count = 1;               /* loop counter */
int pixvis[600];             /* pixel value over time */
int pixe[1];                 /* dummy */
int pix[s][s];               /* pixel values (0-255) */
int pixlast[s][s];           /* previous pixel value */
int fringe[s][s];            /* fringe counter */
int pixmin[s][s];            /* minimum pixel value */
int pixmax[s][s];            /* maximum pixel value */
int pixminlast[s][s];        /* previous minimum */
int pixmaxlast[s][s];        /* previous maximum */
char filename[8];            /* filename string */

/* MAIN PROGRAM */ int main()
{
 char media;                 /* VCR or camera */
 char answer;                /* getch inputs */
 int flag[s][s];             /* conditional */
```

```
int i, j;                              /* loop integers */
int count = 1;                         /* loop counter */
int number = 1;                        /* while loop condition */
int driver = DETECT, mode, code;       /* graphics mode */
float lapse = 0.00;                    /* real number */
clock_t start, end;                    /* clock times */ for (i=0;i<600;i++) pixvis[i]=0;       /* zeros the arrays */
for (i=0;i<s;i++)
{
  for (j=0;j<s;j++)
  {
   flag[i][j]=0;
   fringe[i][j]=0;
   pix[i][j]=0;
   pixlast[i][j]=0;
   pixmax[i][j]=0;
   pixmaxlast[i][j]=0;
   pixmin[i][j]=300;
   pixminlast[i][j]=0;
  }
}

/* GRAPHICS INITIALIZATION */ initgraph(&driver, &mode, "");  /* initialize graphics */
code = graphresult();           /* checks for errors */
if (code != grOk) printf("graphics error!!! %s\n\n",
   grapherrormsg(code));

/* MULTIPLEXER CHANNEL */ printf("Enter multiplexer channel ([V]CR/camera): ");
media = getch();
while (media == ' ');
printf("%c\n", media);
if(media == 'c') channel = 1;   /* 0 = VCR, 1 = camera */

/* FRAMEGRABBER INITIALIZATION */ is_initialize();                /* init framegrabber */
is_init_luts();                 /* init lookup tables */
is_set_sync_source(1);          /* external triggering */
is_select_channel(channel);     /* 0 = VCR, 1 = camera */
is_display(1);                  /* turns on display */
is_select_input_frame(1);       /* input buffer */
```

```
is_select_output_frame(1);      /* displays buffer 1 */
is_frame_clear(1);              /* clears buffer 1 */ cursor();                       /* positioning subroutine */

/* FRAME AQUISITION and INTEGER FRINGE SHIFT COUNTING */ cleardevice();                  /* clears graphics */
gotoxy(1,1);
printf("Hit PAUSE and RETURN to save image and analyse
        data:");

is_frame_clear(1);              /* clears buffer 1 */
is_set_sync_source(1);          /* external triggering */ moveto(0, 450);                 /* graphics cursor start */
setcolor(2);                    /* green */
start = clock();                /* start of clock */ while (number)                  /* frame grab loop */
{
 is_acquire(1, 1);              /* acquires frames */
 for(i=0;i<s;i++)
 {
  for(j=0;j<s;j++)
  {
   is_get_pixel(1, r2+(i+1)*h2/(s+1), c2+(j+1)*w2/(s+1),
       1, pixe);                /* gets pixel value */
   pix[i][j] = pixe[0];

if(pix[i][j] < (0.95*(pixmaxlast[i][j] -
       pixminlast[i][j]) + pixminlast[i][j]) && count > 1)
   {
    if(pix[i][j] > pixlast[i][j] && pixlast[i][j] <
        pixmin[i][j]) pixmin[i][j] = pixlast[i][j];
   }
   if(pixmin[i][j] < (0.4*(pixmaxlast[i][j] -
       pixminlast[i][j]) + pixminlast[i][j]) && pix[i][j] >
       (0.5*(pixmaxlast[i][j] - pixminlast[i][j]) +
       pixminlast[i][j]))
   {
    if(pix[i][j] < pixlast[i][j] && pixlast[i][j] >
         pixmax[i][j]) pixmax[i][j] = pixlast[i][j];
   }
   if(pix[i][j] < (0.95*(pixmax[i][j] - pixminlast[i][j])
        + pixminlast[i][j])) flag[i][j]++;
   if(flag[i][j] > 2)
   {
    fringe[i][j]++;              /* updates fringe count */
    flag[i][j] = 0;
    pixminlast[i][j] = pixmin[i][j];
```

```
      pixmaxlast[i][j] = pixmax[i][j];
      pixmax[i][j] = 0;
      pixmin[i][j] = 300;
    } if(i == (a - 1) && j == (b - 1))
    {
      lineto(count, 450-pix[i][j]);
      pixvis[count] = pix[i][j];

gotoxy(1,10);
      printf("pixmax = %d    \n", pixmax[i][j]);
      printf("pixmaxlast = %d    \n", pixmaxlast[i][j]);
      printf("pix = %d    \n", pix[i][j]);
      printf("fringe = %d    \n", fringe[i][j]);
      printf("pixmin[%d,%d] = %d    \n", i, j, pixmin[i][j]);
      printf("pixminlast = %d    ", pixminlast[i][j]);

}
    pixlast[i][j] = pix[i][j];
  }                                       /* end of j loop */
}                                         /* end of i loop */ if(kbhit() == 0) number = 1;              /* stops acquisition */
else
{
  end = clock();                          /* clock time */
  lapse = (end - start)/CLK_TCK + lapse;  /* elapsed time*/
  is_set_sync_source(channel);            /* triggering */

/* FRAME SAVE/CONTINUE ROUTINE */ gotoxy(1,1);
  printf("-----------------------------------
-----------------------\n");
  printf("Time elapsed = %f s    Frame # = %d\n", lapse,
    count);
  printf("-----------------------------------
-----------------");
  gotoxy(1,4);
  printf("                                                    \n");
  printf("                                                    \n");
  printf("                                                    \n");
  printf("                                                    \n");
  printf("                                                    ");

getch();
  gotoxy(1,4);
  printf("Save this frame? ([n]o/yes): ");
  answer = getch();
```

```
    while (answer == ' ');
    printf("%c\n", answer);
    if(answer == 'y')
    {
     printf("Enter filename with no extension: ");
     scanf("%s", filename);
     saveframe();          /* save image subroutine */
     savefringe();         /* save fringe subroutine */
     savevis();            /* save time slice subroutine */
    }
    printf("Continue? (no/[y]es): ");
    answer = getch();
    while (answer == ' ');
    printf("%c", answer);
    if(answer == 'n') number = 0;
    start = clock();
    is_set_sync_source(number);    /* triggering */
   }                                /* end of save */
   count++;                         /* counter */
  }                         /* end of data aquisition */
  closegraph();                     /* ends graphics */
  printf("\nC Ya!\n");
  is_end();                         /* ends DTiris */
  return 0;                         /* exits program */

}                                   /* end of main */

/*    S  U  B  R  O  U  T  I  N  E  S       */

/* CURSOR POSITIONING SUBROUTINE */ cursor()
{
 int k, l;
 int row = 256;                 /* pixel row */
 int col = 256;                 /* pixel column */
 int number2 = 1;
 char arrow, answer2;

printf("Hit PAUSE and RETURN when ready to define image: ");

while (number2)                /* frame grab loop */
 {
  is_acquire(1, 1);             /* acquires frames */
  if(kbhit() == 0) number2 = 1; /* stops acquisition */
  else
  {
```

```
    number2 = 0;
    is_set_sync_source(channel);    /* triggering */
  }
}
number2 = 1;
cleardevice();                      /* clears graphics */
is_cursor(1);                       /* turns on cursor */
is_set_cursor_position(row, col);
gotoxy(1,1);
printf("Use number pad to define crystal boundaries");
printf("\nPress t when at upper left corner of crystal, b for
  lower right");

while (number2)
{
 arrow = getch();
 if(arrow == '8') row = row - 2;
 if(arrow == '2') row = row + 2;
 if(arrow == '4') col = col - 2;
 if(arrow == '6') col = col + 2;
 if(arrow == '7')
 {
  row = row - 16;
  col = col - 16;
 }
 if(arrow == '9')
 {
  row = row - 16;
  col = col + 16;
 }
 if(arrow == '1')
 {
  row = row + 16;
  col = col - 16;
 }
 if(arrow == '3')
 {
  row = row + 16;
  col = col + 16;
 }
 if(arrow == 't')
 {
  gotoxy(1,7);
  r2 = row;
  c2 = col;
  printf("upper left of crystal accepted (%d,%d)", row,
         col);
 }
 if(arrow == 'b')
 {
  gotoxy(1,8);
```

```c
        h2 = row - r2;
        w2 = col - c2;
        printf("lower right of crystal accepted (%d,%d)", row,
                col);
        gotoxy(1,10);
        printf("Enter coordinates of %d by %d array: ", s, s);
        scanf("%d,%d", &a, &b);
        number2 = 0;
     }
     is_set_cursor_position(row, col);
     gotoxy(1,5);
     printf("position = (%d,%d)", row, col);
   }
   for(k=0;k<s;k++)
   {
     for(l=0;l<s;l++)
     {
       is_get_pixel(1, r2+(k+1)*h2/(s+1), c2+(l+1)*w2/(s+1), 1,
         pixe);
       pixmaxlast[k][l] = pixe[0];
     }
   }
   is_set_cursor_position(r2+a*h2/(s+1), c2+b*w2/(s+1));
   gotoxy(1,11);
   printf("array location = [%d,%d]", a, b);
   gotoxy(1,15);
   printf("Hit PLAY and RETURN to continue: ");
   answer2 = getch();
   while (answer2 == ' ');
   return(0);
}

/* IMAGE SAVING SUBROUTINE */ saveframe()
{
  char filename1[12];

strcpy(filename1, filename);
  strcat(filename1, ".img");
  is_save(1, 0, 1, 0, filename1);     /* DT-IRIS command */
  fcloseall();
  return(0);
}

/* FRINGE SHIFT SAVE SUBROUTINE */ savefringe()
{
  FILE *fringefile;
```

```c
char filename2[12];
int k, l;
float frac[s][s];
for (k=0;k<s;k++)
{
  for (l=0;l<s;l++) frac[k][l]=0;
} strcpy(filename2, filename);
strcat(filename2, ".dat");
if ((fringefile = fopen(filename2, "w")) == NULL)
{
  perror("File saving error");
  return 1;
} for(k=0;k<s;k++)
{
  for(l=0;l<s;l++)
  {
    if(pixmaxlast[k][l] == 0) frac[k][l] = 0;
    else
    {
      if(pix[k][l] > 1.1*pixmin[k][l])
      {
        frac[k][l] = 0.5*(pixmaxlast[k][l]-pix[k][l]);
        frac[k][l] = 1.0 - frac[k][l]/(pixmaxlast[k][l]
               -pixmin[k][l]);
      }
      else
      {
        frac[k][l] = 0.5*(pixmaxlast[k][l]-pix[k][l]);
        frac[k][l] =
           frac[k][l]/(pixmaxlast[k][l]-pixminlast[k][l]);
      }
      if(pixmin[k][l] == 300) frac[k][l] = 0;
      if(frac[k][l] > 1) frac[k][l] = 1;
      if(frac[k][l] < 0) frac[k][l] = 0;
    }
    frac[k][l] = fringe[k][l] + frac[k][l];
    fprintf(fringefile, "%f ", frac[k][l]);
  }
}
fclose(fringefile);
return(0);
}

/* TIME SLICE SAVE SUBROUTINE */ savevis()
```

```
{
FILE *visifile;
int m;
char filename3[12];

strcpy(filename3, filename);
strcat(filename3, ".vis");
if ((visifile = fopen(filename3, "w")) == NULL)
{
 perror("File saving error #2");
 return 1;
}
for (m=0;m<600;m++) fprintf(visifile, "%d ", pixvis[m]);
fclose(visifile);
return(0);
}
```

The estimated quantities are the heat transfer coefficient, the physical path difference between the two legs of the interferometer, and the angle between the k vectors of the two beams. The heat transfer coefficient, h, was taken as an average value for free convection, typically between 5 and 25 W/m²K. The physical path difference, d, and angle Θ, could not be measured to any accuracy and so were chosen to cause one bright fringe to appear in the model with no thermal effects included. These numbers can be picked to cause an initial fringe pattern with several fringes present before heating begins, where Θ has the effect of increasing the number of fringes, and d has the effect of spatially shifting fringes between 0 and 2π.

Most of the measured quantities are in units of length and were simply measured with a ruler. The $CO_2$ power was measured with a Coherent Mode Master power meter at a point close to the sample. Some of the $CO_2$ beam was reflected off the front surface and the reflected power was measured close to the sample and subtracted from the output power to obtain the incident power. In this case, the output power was 5 W and the reflected power was 1.1 W.

The beam waist, w, of the $CO_2$ was measured by decreasing the aperture size of an iris until there was a 36.8% drop in power representing the 1/e diameter.

The absorption coefficient, αλ, for 10.6 μm radiation incident on glass was found by measuring the amount of $CO_2$ power transmitted through a very thin piece of glass, and using this ratio to calculate αλ with the equation $$\frac{P_T}{P_{in}} = e^{-\alpha\lambda l} \tag{62}$$

where l is the thickness, $P_T$ is the transmitted power, and $P_{in}$ is the input power. As mentioned previously, αλ was found to be approximately 3.3 mm$^{-1}$, a number large enough to cause the $e^{-gL}$ term to become small.

The computer programs and subroutines used by the present invention are presented below as Table 2.

TABLE 2

```c
/* AUTOMATED TEMPORAL FRINGE COUNTING PROGRAM */

/* written in Borland C */
/* by Dana C. Kopf */
/* August 1993 */

/* INCLUDE FILES */ include <stdio.h>              /* standard I/O */
include <conio.h>              /* interactive I/O */
#include <string.h>             /* string commands */
#include <time.h>               /* enables clock */
#include <dos.h>                /* dos commands */
#include <graphics.h>           /* graphics commands */
#include "isdefs.h"             /* framegrabber commands */
#define s 9                     /* array size */

/* SUBROUTINES */ int saveframe(void);
int savefringe(void);
int savevis(void);
int cursor(void);

/* GLOBAL VARIABLE DECLARATIONS */ int r2, c2, h2, w2;             /* integers */
int a = 5;                      /* array row */
int b = 5;                      /* array column */
int channel = 0;                /* multiplexer channel */
int count = 1;                  /* loop counter */
int pixvis[600];                /* pixel value over time */
int pixe[1];                    /* dummy */
int pix[s][s];                  /* pixel values (0-255) */
int pixlast[s][s];              /* previous pixel value */
int fringe[s][s];               /* fringe counter */
int pixmin[s][s];               /* minimum pixel value */
int pixmax[s][s];               /* maximum pixel value */
int pixminlast[s][s];           /* previous minimum */
int pixmaxlast[s][s];           /* previous maximum */
char filename[8];               /* filename string */

/* MAIN PROGRAM */ int main()
{
 char media;                    /* VCR or camera */
 char answer;                   /* getch inputs */
 int flag[s][s];                /* conditional */
```

```c
int i, j;                           /* loop integers */
int count = 1;                      /* loop counter */
int number = 1;                     /* while loop condition */
int driver = DETECT, mode, code;    /* graphics mode */
float lapse = 0.00;                 /* real number */
clock_t start, end;                 /* clock times */ for (i=0;i<600;i++) pixvis[i]=0;    /* zeros the arrays */
for (i=0;i<s;i++)
{
 for (j=0;j<s;j++)
 {
  flag[i][j]=0;
  fringe[i][j]=0;
  pix[i][j]=0;
  pixlast[i][j]=0;
  pixmax[i][j]=0;
  pixmaxlast[i][j]=0;
  pixmin[i][j]=300;
  pixminlast[i][j]=0;
 }
}

/* GRAPHICS INITIALIZATION */ initgraph(&driver, &mode, "");   /* initialize graphics */
code = graphresult();            /* checks for errors */
if (code != grOk) printf("graphics error!!! %s\n\n",
    grapherrormsg(code));

/* MULTIPLEXER CHANNEL */ printf("Enter multiplexer channel ([V]CR/camera): ");
media = getch();
while (media == ' ');
printf("%c\n", media);
if(media == 'c') channel = 1;    /* 0 = VCR, 1 = camera */

/* FRAMEGRABBER INITIALIZATION */ is_initialize();             /* init framegrabber */
    is_init_luts();              /* init lookup tables */
    is_set_sync_source(1);       /* external triggering */
    is_select_channel(channel);  /* 0 = VCR, 1 = camera */
    is_display(1);               /* turns on display */
    is_select_input_frame(1);    /* input buffer */
```

```
is_select_output_frame(1);    /* displays buffer 1 */
is_frame_clear(1);            /* clears buffer 1 */ cursor();                     /* positioning subroutine */

/* FRAME AQUISITION and INTEGER FRINGE SHIFT COUNTING */ cleardevice();                /* clears graphics */
gotoxy(1,1);
printf("Hit PAUSE and RETURN to save image and analyse
        data:");

is_frame_clear(1);            /* clears buffer 1 */
is_set_sync_source(1);        /* external triggering */ moveto(0, 450);               /* graphics cursor start */
setcolor(2);                  /* green */
start = clock();              /* start of clock */ while (number)                /* frame grab loop */
{
 is_acquire(1, 1);            /* acquires frames */
 for(i=0;i<s;i++)
 {
  for(j=0;j<s;j++)
  {
   is_get_pixel(1, r2+(i+1)*h2/(s+1), c2+(j+1)*w2/(s+1),
     1, pixe);                /* gets pixel value */
   pix[i][j] = pixe[0];

if(pix[i][j] < (0.95*(pixmaxlast[i][j] -
       pixminlast[i][j]) + pixminlast[i][j]) && count > 1)
   {
    if(pix[i][j] > pixlast[i][j] && pixlast[i][j] <
       pixmin[i][j]) pixmin[i][j] = pixlast[i][j];
   }
   if(pixmin[i][j] < (0.4*(pixmaxlast[i][j] -
       pixminlast[i][j]) + pixminlast[i][j]) && pix[i][j] >
       (0.5*(pixmaxlast[i][j] - pixminlast[i][j]) +
       pixminlast[i][j]))
   {
    if(pix[i][j] < pixlast[i][j] && pixlast[i][j] >
         pixmax[i][j]) pixmax[i][j] = pixlast[i][j];
   }
   if(pix[i][j] < (0.95*(pixmax[i][j] - pixminlast[i][j])
       + pixminlast[i][j])) flag[i][j]++;
   if(flag[i][j] > 2)
   {
    fringe[i][j]++;            /* updates fringe count */
    flag[i][j] = 0;
    pixminlast[i][j] = pixmin[i][j];
```

```
    pixmaxlast[i][j] = pixmax[i][j];
    pixmax[i][j] = 0;
    pixmin[i][j] = 300;
    } if(i == (a - 1) && j == (b - 1))
    {
    lineto(count, 450-pix[i][j]);
    pixvis[count] = pix[i][j];

gotoxy(1,10);
    printf("pixmax = %d    \n", pixmax[i][j]);
    printf("pixmaxlast = %d    \n", pixmaxlast[i][j]);
    printf("pix = %d    \n", pix[i][j]);
    printf("fringe = %d    \n", fringe[i][j]);
    printf("pixmin[%d,%d] = %d    \n", i, j, pixmin[i][j]);
    printf("pixminlast = %d   ", pixminlast[i][j]);

}
    pixlast[i][j] = pix[i][j];
    }                                    /* end of j loop */
    }                                    /* end of i loop */ if(kbhit() == 0) number = 1;         /* stops acquisition */
    else
    {
    end = clock();                       /* clock time */
    lapse = (end - start)/CLK_TCK + lapse; /* elapsed time*/
    is_set_sync_source(channel);         /* triggering */

/* FRAME SAVE/CONTINUE ROUTINE */ gotoxy(1,1);
    printf("---------------------------------
    ----------------------\n");
    printf("Time elapsed = %f s    Frame # = %d\n", lapse,
     count);
    printf("---------------------------------
    ----------------");
    gotoxy(1,4);
    printf("                                              \n");
    printf("                                              \n");
    printf("                                              \n");
    printf("                                              \n");
    printf("                                              ");

getch();
    gotoxy(1,4);
    printf("Save this frame? ([n]o/yes): ");
    answer = getch();
```

```
      while (answer == ' ');
      printf("%c\n", answer);
      if(answer == 'y')
      {
       printf("Enter filename with no extension: ");
       scanf("%s", filename);
       saveframe();         /* save image subroutine */
       savefringe();        /* save fringe subroutine */
       savevis();           /* save time slice subroutine */
      }
      printf("Continue? (no/[y]es): ");
      answer = getch();
      while (answer == ' ');
      printf("%c", answer);
      if(answer == 'n') number = 0;
      start = clock();
      is_set_sync_source(number);    /* triggering */
     }                                /* end of save */
    count++;                          /* counter */
  }                          /* end of data aquisition */
  closegraph();                       /* ends graphics */
  printf("\nC Ya!\n");
  is_end();                           /* ends DTiris */
  return 0;                           /* exits program */

}                                     /* end of main */

/*    S  U  B  R  O  U  T  I  N  E  S       */

/* CURSOR POSITIONING SUBROUTINE */ cursor()
{
 int k, l;
 int row = 256;              /* pixel row */
 int col = 256;              /* pixel column */
 int number2 = 1;
 char arrow, answer2;

printf("Hit PAUSE and RETURN when ready to define image: ");

while (number2)                      /* frame grab loop */
 {
   is_acquire(1, 1);                  /* acquires frames */
   if(kbhit() == 0) number2 = 1;      /* stops acquisition */
   else
   {
```

```
    number2 = 0;
    is_set_sync_source(channel);      /* triggering */
   }
  }
 number2 = 1;
 cleardevice();                        /* clears graphics */
 is_cursor(1);                         /* turns on cursor */
 is_set_cursor_position(row, col);
 gotoxy(1,1);
 printf("Use number pad to define crystal boundaries");
 printf("\nPress t when at upper left corner of crystal, b for
    lower right");

while (number2)
 {
  arrow = getch();
  if(arrow == '8') row = row - 2;
  if(arrow == '2') row = row + 2;
  if(arrow == '4') col = col - 2;
  if(arrow == '6') col = col + 2;
  if(arrow == '7')
  {
   row = row - 16;
   col = col - 16;
  }
  if(arrow == '9')
  {
   row = row - 16;
   col = col + 16;
  }
  if(arrow == '1')
  {
   row = row + 16;
   col = col - 16;
  }
  if(arrow == '3')
  {
   row = row + 16;
   col = col + 16;
  }
  if(arrow == 't')
  {
   gotoxy(1,7);
   r2 = row;
   c2 = col;
   printf("upper left of crystal accepted (%d,%d)", row,
           col);
  }
  if(arrow == 'b')
  {
   gotoxy(1,8);
```

```
    h2 = row - r2;
    w2 = col - c2;
    printf("lower right of crystal accepted (%d,%d)", row,
           col);
    gotoxy(1,10);
    printf("Enter coordinates of %d by %d array: ", s, s);
    scanf("%d,%d", &a, &b);
    number2 = 0;
  }
  is_set_cursor_position(row, col);
  gotoxy(1,5);
  printf("position = (%d,%d)", row, col);
 }
 for(k=0;k<s;k++)
 {
   for(l=0;l<s;l++)
   {
    is_get_pixel(1, r2+(k+1)*h2/(s+1), c2+(l+1)*w2/(s+1), 1,
      pixe);
    pixmaxlast[k][l] = pixe[0];
   }
 }
 is_set_cursor_position(r2+a*h2/(s+1), c2+b*w2/(s+1));
 gotoxy(1,11);
 printf("array location = [%d,%d]", a, b);
 gotoxy(1,15);
 printf("Hit PLAY and RETURN to continue: ");
 answer2 = getch();
 while (answer2 == ' ');
 return(0);
}

/* IMAGE SAVING SUBROUTINE */ saveframe()
{
 char filename1[12];

strcpy(filename1, filename);
 strcat(filename1, ".img");
 is_save(1, 0, 1, 0, filename1);     /* DT-IRIS command */
 fcloseall();
 return(0);
}

/* FRINGE SHIFT SAVE SUBROUTINE */ savefringe()
{
 FILE *fringefile;
```

```
char filename2[12];
int k, l;
float frac[s][s];
for (k=0;k<s;k++)
{
 for (l=0;l<s;l++) frac[k][l]=0;
} strcpy(filename2, filename);
strcat(filename2, ".dat");
if ((fringefile = fopen(filename2, "w")) == NULL)
{
 perror("File saving error");
 return 1;
} for(k=0;k<s;k++)
{
 for(l=0;l<s;l++)
 {
  if(pixmaxlast[k][l] == 0) frac[k][l] = 0;
  else
  {
   if(pix[k][l] > 1.1*pixmin[k][l])
   {
    frac[k][l] = 0.5*(pixmaxlast[k][l]-pix[k][l]);
    frac[k][l] = 1.0 - frac[k][l]/(pixmaxlast[k][l]
         -pixmin[k][l]);
   }
   else
   {
    frac[k][l] = 0.5*(pixmaxlast[k][l]-pix[k][l]);
    frac[k][l] =
      frac[k][l]/(pixmaxlast[k][l]-pixminlast[k][l]);
   }
   if(pixmin[k][l] == 300) frac[k][l] = 0;
   if(frac[k][l] > 1) frac[k][l] = 1;
   if(frac[k][l] < 0) frac[k][l] = 0;
  }
  frac[k][l] = fringe[k][l] + frac[k][l];
  fprintf(fringefile, "%f ", frac[k][l]);
 }
}
fclose(fringefile);
return(0);
}

/* TIME SLICE SAVE SUBROUTINE */ savevis()
```

```c
{
 FILE *visifile;
 int m;
 char filename3[12];

strcpy(filename3, filename);
 strcat(filename3, ".vis");
 if ((visifile = fopen(filename3, "w")) == NULL)
 {
  perror("File saving error #2");
  return 1;
 }
 for (m=0;m<600;m++) fprintf(visifile, "%d ", pixvis[m]);
 fclose(visifile);
 return(0);
}
```

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An interferometric based diagnostic system for determining time dependent changes in optical path difference characteristics of a sample of a laser gain media, and which comprises:

an optical heat source system which emits an optical heating beam to heat said sample of said laser gain media over a period of time;

a means for producing a probe laser beam;

an interferometer which splits and directs said probe laser beam through said sample of said laser gain media to output thereby an interferometry beam with a fringe shift pattern that changes over said period of time; and a means for correlating samples of said fringe shift pattern into estimates of the optical path difference characteristics of the sample of the laser gain media.

2. An interferometric based diagnostic system, as defined in claim 1, wherein said correlating means comprises:

a camera unit that converts samples of the interferometry beam with the fringe shift pattern into an electronic digital data stream; and a means for processing data that processes the electronic digital data stream of the camera unit into estimates of the optical path difference characteristics of the sample of the laser gain media using a programmed set of correlation relationships that convert fringe shift characteristics into optical path difference characteristics.

3. An interferometric based diagnostic system, as defined in claim 1, wherein said optical heat source comprises:

a heating laser that emits a heating laser beam;

an alignment laser that emits an alignment beam; and a means for directing the alignment beam and the heating laser beam at the sample of the laser gain media.

4. An interferometric based diagnostic system, as defined in claim 2, wherein said optical heat source comprises:

a heating laser that emits a heating laser beam;

an alignment laser that emits an alignment beam; and a means for directing the alignment beam and the heating laser beam at the sample of the laser gain media.

5. An interferometric based diagnostic system, as defined in claim 1, wherein said means for producing said probe laser beam comprises a HeNe laser unit.

6. An interferometric based diagnostic system, as defined in claim 2, wherein said means for producing said probe laser beam comprises a HeNe laser unit.

7. An interferometric based diagnostic system, as defined in claim 3, wherein said means for producing said probe laser beam comprises a HeNe laser unit.

8. An interferometric based diagnostic system, as defined in claim 4, wherein said means for producing said probe laser beam comprises a HeNe laser unit.

9. An interferometric based diagnostic system, as defined in claim 1, wherein said interferometer comprises a Mach-Zehnder interferometer which uses two mirrors and two beam splitters to split and direct said probe laser beam through said sample of said laser gain media to output thereby said interferometry beam with said fringe shift pattern.

10. An interferometric based diagnostic system, as defined in claim 2, wherein said interferometer comprises a Mach-Zehnder interferometer which uses two mirrors and two beam splitters to split and direct said probe laser beam through said sample of said laser gain media to output thereby said interferometry beam with said fringe shift pattern.

11. An interferometric based diagnostic system, as defined in claim 3, wherein said interferometer comprises a Mach-Zehnder interferometer which uses two mirrors and two beam splitters to split and direct said probe laser beam through said sample of said laser gain media to output thereby said interferometry beam with said fringe shift pattern.

12. An interferometric based diagnostic system, as defined in claim 4, wherein said interferometer comprises a Mach-Zehnder interferometer which uses two mirrors and two beam splitters to split and direct said probe laser beam through said sample of said laser gain media to output thereby said interferometry beam with said fringe shift pattern.

13. An interferometric based diagnostic system, as defined in claim 5, wherein said interferometer comprises a Mach-Zehnder interferometer which uses two mirrors and two beam splitters to split and direct said probe laser beam through said sample of said laser gain media to output thereby said interferometry beam with said fringe shift pattern.

14. An interferometric based diagnostic system, as defined in claim 6, wherein said interferometer comprises a Mach-Zehnder interferometer which uses two mirrors and two beam splitters to split and direct said probe laser beam through said sample of said laser gain media to output thereby said interferometry beam with said fringe shift pattern.

15. An interferometric based diagnostic system, as defined in claim 7, wherein said interferometer comprises a Mach-Zehnder interferometer which uses two mirrors and two beam splitters to split and direct said probe laser beam through said sample of said laser gain media to output thereby said interferometry beam with said fringe shift pattern.

16. An interferometric based diagnostic system, as defined in claim 8, wherein said interferometer comprises a Mach-Zehnder interferometer which uses two mirrors and two beam splitters to split and direct said probe laser beam through said sample of said laser gain media to output thereby said interferometry beam with said fringe shift pattern.

17. An interferometric based diagnostic system, as defined in claim 1, which further comprises:

an enclosure that isolates the interferometer, the sample, the optical heat source and the probe laser beam from effects of air currents; and a recording element that records the samples of the fringe shift pattern over the period of time in which the interferometric based diagnostic system is used.

18. An interferometric based diagnostic system, as defined in claim 3, wherein said heating laser comprises a $CO_2$ laser.

* * * * *